Dec. 25, 1951   W. F. ALLER ET AL   2,580,342
GAUGING DEVICE

Filed July 5, 1947   3 Sheets-Sheet 1

INVENTOR.
W. F. Aller
D. H. McConnell
BY
Edward T. Noe Jr
atty.

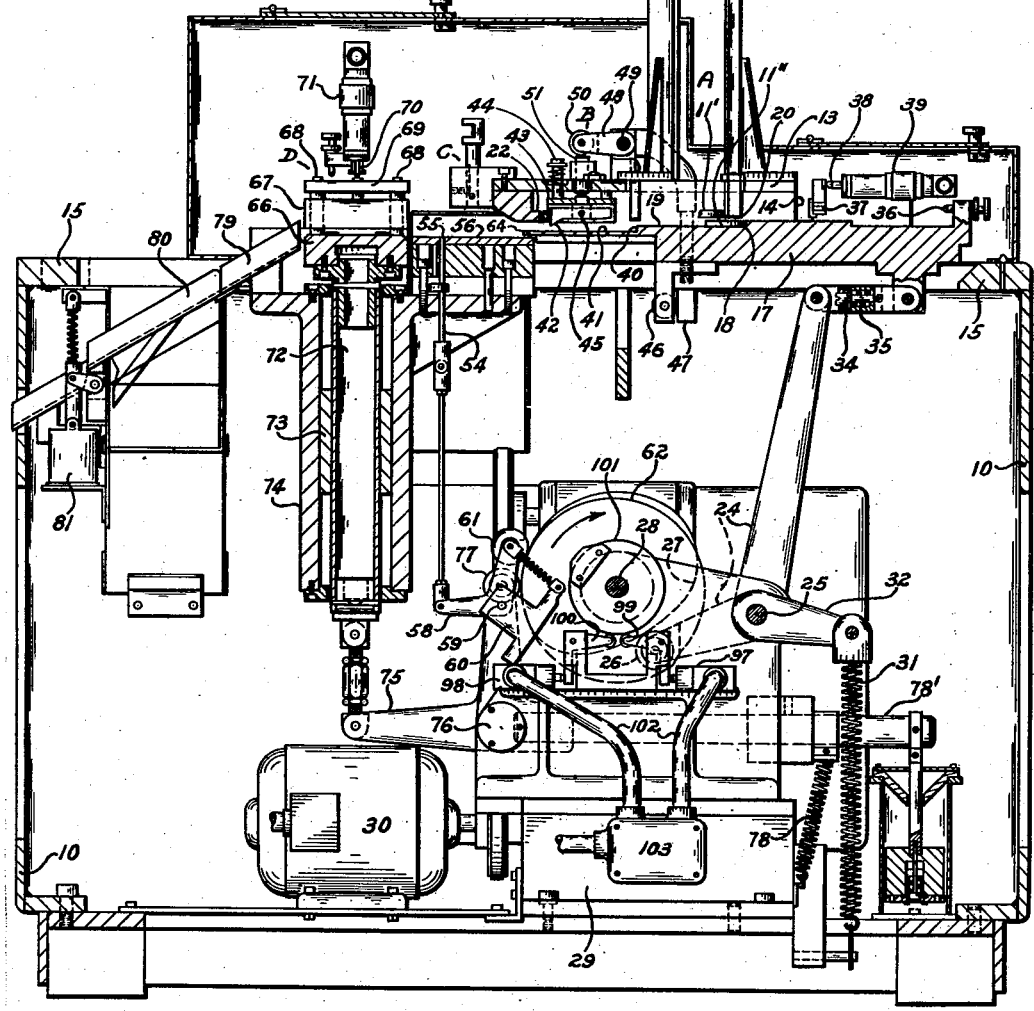
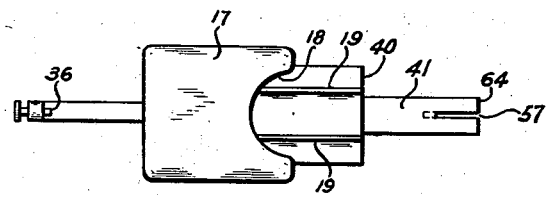
Fig-3
Fig-4

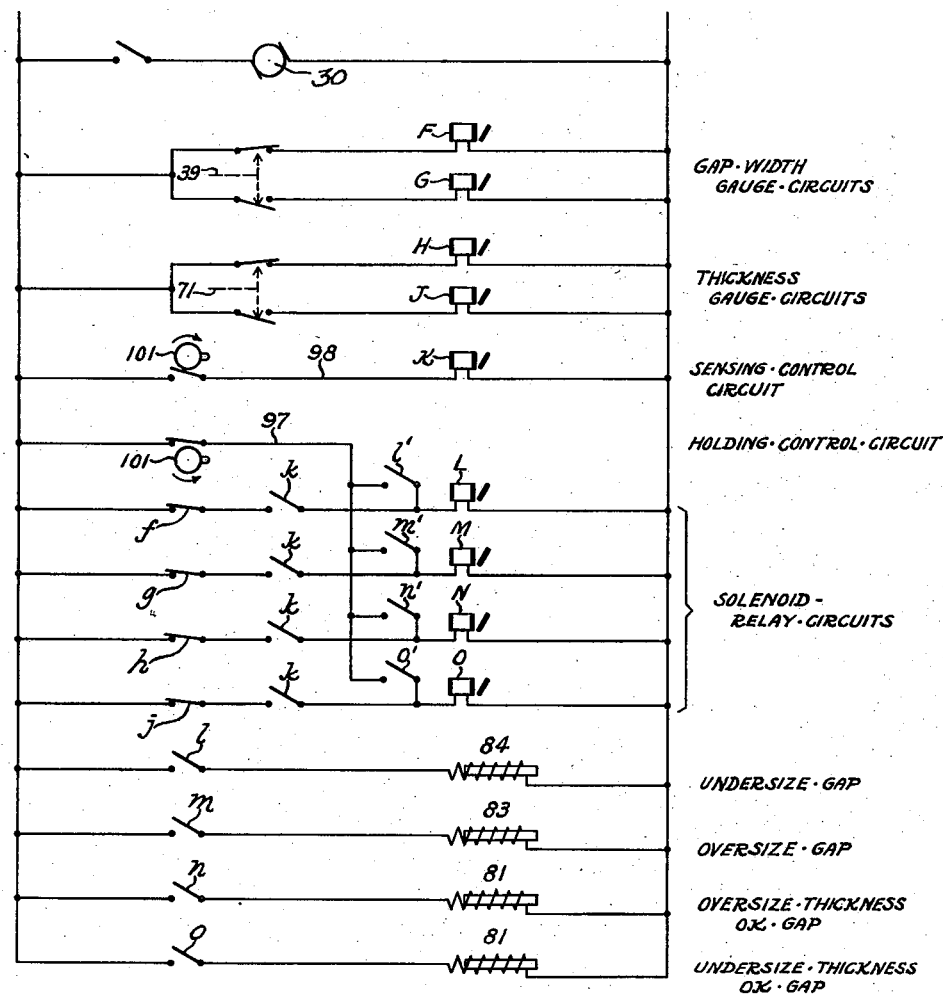

Patented Dec. 25, 1951

2,580,342

UNITED STATES PATENT OFFICE 2,580,342

GAUGING DEVICE

Willis Fay Aller and David H. McConnell, Dayton, Ohio, assignors to The Sheffield Corporation, Dayton, Ohio, a corporation of Ohio Application July 5, 1947, Serial No. 759,018

7 Claims. (Cl. 209—75)

This invention relates to gauging devices and more particularly to gauging devices for measuring or comparing physical dimensions of a workpiece such as a piston ring or the like.

One object of the invention is the provision of a ring gauging device having provision for moving the rings one at a time from the bottom of the stack to a first gauging station where a physical dimension of the ring is checked, the same feed means that moves the ring to the first gauging station then carrying the ring to a transfer station from which the passage of the ring is controlled automatically by the operation of the gauging mechanism mentioned.

Another object is the provision of a gauging device having a feed slide for advancing rings one at a time to a first gauging station, the slide also having a shoulder or projection for moving the ring from the gauging station to a subsequent station while supporting the ring thereon.

Another object is the provision of a gauging device adapted to gauge the ring gap and the maximum axial thickness of the ring with simple provision for moving the ring from and to successive stations.

Another object is the provision of a gauging device in which the rings are advanced to a location between two flat gauging plates that receive the ring between them and which are yieldingly actuated at the proper time in the sequence of operation to contact the ring and gauge its maximum thickness.

Other objects and advantages of the invention will be apparent from the following description, the appended claims and the accompanying drawing, in which, Fig. 1 is a perspective view showing the upper portion of a gauging device embodying the present invention;

Fig. 3 is a vertical longitudinal section through the gauging device; and

Fig. 4 is a detail on a reduced scale showing the feed slide; and

Fig. 5 is a diagrammatic showing of the electrical connections for the solenoids.

Figure 2:
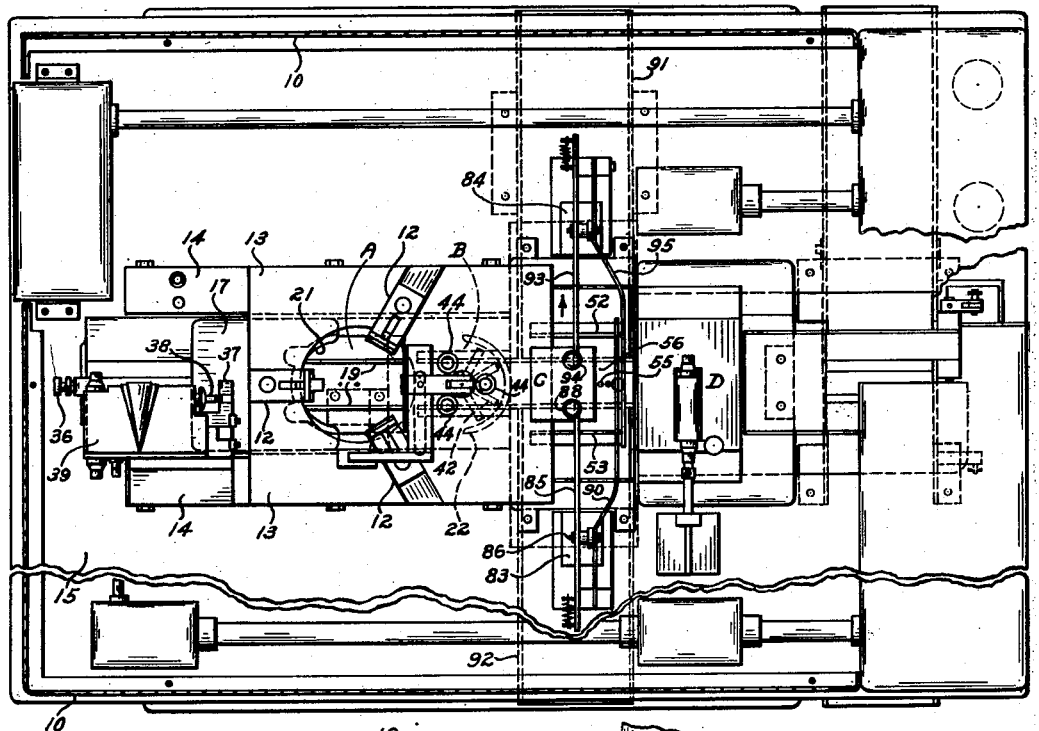
Fig. 2 is a top plan view of the gauging device.

Referring more particularly to the drawing, in which the same reference numerals are applied to like parts in the several views, the invention as herein disclosed is shown in its adaptation for gauging the ring gap and the maximum axial thickness of rings such as piston rings. In this form of construction the device comprises a support or base 10 having a supply station at A, a first gauging station B, a transfer station C and a second gauging station D, through which the rings are successively moved one at a time, there being provision for automatically segregating the rings according to dimensions.

Figure 1:
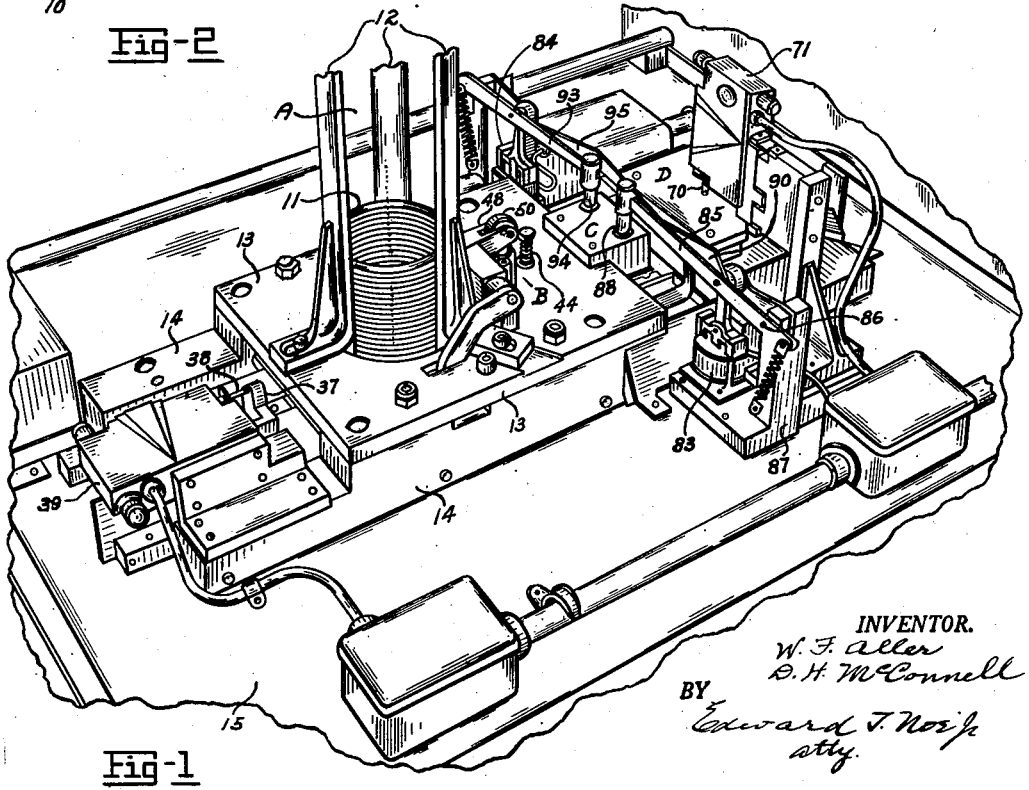

At the supply station A the piston rings or work-pieces 11 are arranged in a stack between three guide pillars 12 secured to a plate 13 mounted in turn on longitudinal bars 14 fixed on a table 15 which forms part of the main support or base 16. There is a hole in the plate 13 large enough to receive the piston rings in expanded condition, the rings fitting loosely between the pillars 12 so they can readily drop through of their own weight. The lowest ring of the stack, indicated at 11' in Fig. 3, can drop down on the feed slide 17 in front of a feeding shoulder 18 to the position shown at 11'' in Fig. 3 when the feed slide is fully retracted as indicated in that figure so that it can rest on the flat surface 19 of the feed slide with the upper surface of the ring located just below the lower ends 20 of the pillars 12. Thus when the feed slide is moved to the left from its retracted position shown in Fig. 3, or to the right as shown in Figs. 1 and 2, the lowest piston ring would be advanced a distance corresponding to the feed slide stroke to the first gauging station B.

The shoulder 18 on the feed slide that moves the piston ring from the stack is of segmental form as shown in Fig. 4 and having a curvature corresponding to the piston ring curvature when the ring is closed. This shoulder compresses the ring against a curved fixed abutment plate 22, squeezing the ring until the gap closes and when the ring is closed the ring will stop the forward or advancing travel of the slide and the position of the feed slide will then indicate the collapsed size of the piston ring so that the size of the ring gap in normal operation when the ring is operating in a cylinder of the proper size can be readily determined.

The feed slide 17 is reciprocally operable by means of a bell crank lever 24 pivoted at 25 and having a roller 26 operating against the periphery of a cam 27 on a shaft 28. The shaft is rotated through suitable transmission mechanism contained in a transmission box 29 and driven by electric motor 30. The tension spring 31 connected to an arm 32 on the bell crank lever serves to return the slide 17 by moving the bell crank clockwise as viewed in Fig. 3. The upper end of the bell crank lever is connected through a spring link 34 to the slide 17, the spring 35 in the spring link permitting the link to extend from a normal retracted condition when the motion of the feed slide 17 is stopped by the compressed piston ring. The extent of travel of the slide 17 is measured by means of a contact point 36 carried by the slide which comes into engagement with an actuator 37 engaging the plunger 38 of a gauging switch 39 containing switches of the character for example as shown in Patent 2,254,313 granted September 2, 1941. These switches serve to control the path of movement of the gauged ring after it leaves the gauging station, as will be presently described.

The feed plate 17 is suitably stepped to provide a shoulder 40 and a ring supporting surface 41 which is lower than the surface 19 by an amount corresponding to the thickness of the piston ring being gauged. After the ring is compressed by the feed slide at the gauging station B and the feed slide is then retracted, the ring is held in the station B until the retraction movement of the feed slide is substantially completed and the ring then drops down on the surface 41 in front of the shoulder 40 so that when the next feed stroke of the slide occurs, the ring will be advanced by the shoulder 40 to the transfer station C. The ring is held in the gauging station B by one or more latching fingers 42 carried by a latch plate 43 which is normally held in raised position by springs 44. In this raised position the latching fingers 42, which are pivotally mounted at 45 can engage the leading end of the piston ring when the latter is in full contact with the abutment plate 22 so that the ring will not be carried back by the slide 17 when the slide returns. At the end of the return stroke of the slide a roller 46 on the slide engages the lower end 47 of the arm 48 which is pivotally mounted at 49 so that this arm is rocked counter-clockwise, lowering the roller 50 which depresses a plunger 51 to move the latch plate 43 downwardly and release the ring so that the ring will drop, as previously mentioned, on surface 41 of the slide.

When the ring is advanced by the shoulder 40 to the transfer station C, if the ring satisfies the tolerance requirements of the first gauging station, the ring will lie horizontally on the surface 41 just above the tracks 52 and 53 and will be held from returning when the slide returns by means of a retaining pin 54 operable upwardly through a hole 55 in a plate 56 and through a slot 57 in the feed plate. This pin is projected back of the leading portion of the piston ring by means of a bell crank lever 58 pivotally carried at 59 in a bracket 60 and having roller 61 engaging a cam 62 on shaft 28.

When the slide returns, the pin 54 will keep the ring from returning and the ring will then drop on the tracks 52 and 53 and on the plate 56. The pin 54 is then retracted. The next stroke of the slide 17 then advances the ring to the second gauging station D, the end 64 of the slide pushing the ring along ahead of it to advance the ring onto the movable plate 66 and below a stationary plate 67, these plates being spaced apart at this time so the ring is freely received between them. The movable plate is connected by studs 68 at the corners of the plate to a vertically movable gauging plate 69 which operates the gauging plunger 70 of a gauging switch 71 similar to the switch 39. Switch 71 controls the path of movement of the ring when it leaves this gauging station, as will be presently described. The plate 66 on which the ring is received is carried by a plunger 72 guided in a bearing 73 in a stationary bearing member 74. The lower end of the plunger 72 is connected to a bell crank lever 75 pivotally supported at 76 and having an arm provided with a roller 77 engaging the cam 62. At the proper time in the sequence of operation after the ring is moved to the gauging station D and during the retracting movement of the slide 17 this cam permits the bell crank lever 75 to be turned clockwise by a spring 78 on an arm 78' fixed to arm 75 which yieldingly raises the plate 66 and applies a predetermined pressure on the piston ring, the extent of movement of the plates 66 and 69 being indicated by the gauging switch 71. Parallel movement of the parallel gauging surfaces on the plates 66 and 67 is assured due to the guiding action of the bearing 73.

When a ring is advanced into the gauging station D, that ring pushes a previously gauged ring already in the gauging station D and the gauged ring slides down a trough 79 and then onto movable trough sections 80 that can be selectively lowered by a pair of solenoids 81 controlled by the switch 71 so that the ring descends into any one of three different paths according to whether the ring is of the desired axial thickness or is too thick or too thin. Since any suitable trough arrangement can be used to control the path of movement of the ring after it leaves gauging station D, the details of this arrangement have not been illustrated.

When the ring is in the gauging station B, the operation of the one or the other of the two switches in the gauging switch 39 determines whether or not the ring will be deflected either to the right or to the left of the path of forward travel when the ring reaches the transfer station C. For this purpose each of the two switches of switch 39 controls one of the two solenoids 83 and 84. The energization of the solenoid 83 serves to depress a lever 85 which is pivoted at 86 on a supporting bracket 87. When the arm 85 is thus lowered it depresses a deflecting pin 88 into the path of ring travel at one side of the piston ring, causing the piston ring to be deflected to the left of transfer station C as viewed in Figs. 1 and 2. At the same time the arm 85 lowers pin 88, it also lowers an arm 90 also pivoted at 86, the end of this arm being fixed to the track 52. Thus one side of the track is lowered and a stop pin is projected at the other side of the piston ring, causing the piston ring to travel in the direction of the arrow, shown in Fig. 2, to a reject chamber or collecting box 91 for oversize rings for example. Undersize rings are deflected into a receptacle 92 at the other side of the apparatus when solenoid 84 is energized, thus lowering arm 93 and the deflecting pin 94, and lowering the arm 95 which carries the track section 53. If neither one of the switches in the gauging switch 39 is energized, the piston ring is of the proper size and rests on both of the track sections with neither of the deflecting pins 88, 94 lowered into its path, so the ring can travel straight along at the next operation of the slide, to the gauging station D. The relays 83 and 84 are energized through holding circuits operated at the proper time in the stroke of the slide 17 and at the start of the slide movements. This is accomplished through timing switches 97 and 98 respectively controlled by cam operated bell cranks 99 and 100 which are moved by a timing cam 101 and the shaft 28. These limit switches 97 and 98 are electrically connected by suitable wiring extending through conduits 102 to the circuits contained in the relay panel 103 and controlling solenoids 83 and 84.

In accordance with the present invention, it will be apparent that the piston rings are moved ahead one at a time in a step by step manner to and through successive gauging stations and through an intermediate or transfer station. The moving means by which the piston rings are advanced is a simple stepped reciprocating plate so arranged that the rings drop gradually, a step at a time, as they are moved out of the stack or from the first gauging position or into the transfer station. As the rings reach the transfer station C they are automatically caused to move either to the right or to the left according to whether they are too large or too small, those rings of the proper size remaining so they can be pushed straight ahead by the end of the feed slide into the second gauging station when the next ring comes into the transfer station. The gauging operation at the gauging station D is such that the maximum thickness of the piston ring, measured in an axial direction, is gauged. The rings as they leave this gauging station then have a controlled path of movement as they descend the guide tracks. The entire operation is preferably automatic so that all that is required by the operator is to place the rings in the stack between the locating pedestals 12.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Gauging apparatus comprising a support having a feed slide reciprocably slidable thereon and operable to advance a piston ring from a supply station to a gauging station, a fixed segmental abutment plate, said feed slide having a segmental portion cooperating with said abutment plate to compress the ring so that the gap closes, means for gauging the extent of travel of the feed slide to thereby gauge the ring gap at said first gauging station, said feed slide having a stepped portion on which the ring drops at the gauging station when the slide is retracted so it will be further advanced when the slide is projected.

2. A ring gauging device having a supply station and a gauging station, means at the supply station for holding a stack of rings to be gauged, a reciprocable slide having a ring supporting surface and a feeding shoulder adjacent said surface for moving the lowest ring in the stack while on said surface to the gauging station, gauging means at the gauging station for gauging a physical characteristic of the ring, said slide having a second ring supporting surface parallel to and below the level of the first said surface, a second shoulder on said slide below the level of the feeding shoulder for moving a ring from the gauging station while on said second surface to a transfer station and means operated by said gauging means to control the path of movement of the ring at the transfer station.

3. Gauging apparatus as set forth in claim 1 including guide means for locating a stack of piston rings at the supply station in position such that the ring at the bottom of the stack is engaged and is moved by the segmental portion of the feed slide in a line of advance which is above the level of the line of advance of the ring when on the stepped portion of the feed slide.

4. Gauging apparatus as set forth in claim 1 in which the forward end of said stepped portion is provided with a shoulder for advancing the ring at a lower level after it is advanced on said stepped portion, and means for supporting the ring at such lower level during this advance by said shoulder.

5. Gauging apparatus as set forth in claim 1 in which the forward end of said stepped portion is provided with a shoulder for advancing the ring at a lower level after its advance on said stepped portion, and means controlled by said gauging means when the ring fails to satisfy the gauging requirements of the gauging station for blocking the path of advance of the ring at one side of the ring center to deflect the ring laterally of a straight line of advance.

6. Gauging apparatus as set forth in claim 1 including a transfer station to which the ring is advanced by the stepped portion of the slide, and having a second gauging station for gauging the ring thickness, said feed slide having a shoulder for advancing the ring from the transfer station to said second gauging station.

7. Gauging apparatus as set forth in claim 1 including a transfer station to which the ring is advanced by said slide from the gauging station, means at said transfer station controlling the path of movement of the rings supplied thereto and controlled by said means at the gauging station so that only the rings that have satisfied the requirements of the first gauging station are advanced in a straight line from the gauging station to a second gauging station, and a second gauging station having means for gauging ring thickness, the forward end of the slide having a shoulder for pushing the rings into said second gauging station at a lower level than when the ring is on said stepped portion.

WILLIS FAY ALLER.
DAVID H. McCONNELL.

REFERENCES CITED

The following references are of record in the file of this patent:

UNITED STATES PATENTS

| Number | Name | Date |
|---|---|---|
| 1,275,960 | Maynard | Aug. 13, 1918 |
| 1,310,837 | Murch | July 22, 1919 |
| 1,439,469 | Hapgood | Dec. 19, 1922 |
| 1,544,762 | King | July 7, 1925 |
| 1,873,315 | Dreyer | Aug. 23, 1932 |
| 2,091,815 | Hommel | Aug. 31, 1937 |
| 2,243,649 | Pearson | May 27, 1941 |
| 2,487,629 | Aller | Nov. 8, 1949 |

FOREIGN PATENTS

| Number | Country | Date |
|---|---|---|
| 35,153 | Austria | Nov. 10, 1908 |